US 8,416,289 B2

United States Patent
Akeley (10) Patent No.: US 8,416,289 B2
(45) Date of Patent: Apr. 9, 2013

(54) LIGHT-FIELD DISPLAY

(75) Inventor: Kurt Akeley, Novato, CA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 12/430,896

(22) Filed: Apr. 28, 2009

(65) Prior Publication Data

US 2010/0271467 A1    Oct. 28, 2010

(51) Int. Cl.
*H04N 13/04* (2006.01)

(52) U.S. Cl. .................. 348/59; 348/53; 348/51

(58) Field of Classification Search .......... 348/51, 348/53, 59
See application file for complete search history.

(56) References Cited

U.S. PATENT DOCUMENTS

| | | | |
|---|---|---|---|
| 5,769,227 A | 6/1998 | Fantone | |
| 5,883,606 A * | 3/1999 | Smoot | 345/7 |
| 6,462,871 B1 | 10/2002 | Morishima | |
| 6,559,821 B2 * | 5/2003 | Ichikawa et al. | 345/92 |
| 6,795,241 B1 | 9/2004 | Holzbach | |
| 6,825,985 B2 | 11/2004 | Brown et al. | |
| 7,486,341 B2 * | 2/2009 | Hong et al. | 349/11 |
| 7,667,783 B2 * | 2/2010 | Hong et al. | 349/11 |
| 8,179,425 B2 * | 5/2012 | Harrold et al. | 348/51 |
| 2002/0036606 A1 * | 3/2002 | Ichikawa et al. | 345/87 |
| 2003/0107804 A1 | 6/2003 | Dolgoff | |
| 2004/0119896 A1 | 6/2004 | Kean et al. | |
| 2005/0057491 A1 | 3/2005 | Zacks et al. | |
| 2005/0270645 A1 | 12/2005 | Cossairt et al. | |
| 2006/0158511 A1 * | 7/2006 | Harrold et al. | 348/51 |
| 2007/0097277 A1 * | 5/2007 | Hong et al. | 349/11 |

OTHER PUBLICATIONS

Kobayashi, et al., "Character Interaction System with Autostereoscopic Display and Range Sensor", IEEE Symposium on 3D User interfaces, Mar. 10-11, 2007, pp. 95-98.
Akeley, et al., "A Stereo Display Prototype with Multiple Focal Distances", ACM SIGGRAPH 2004 Papers, Aug. 8-12, 2004, pp. 804-813.
Backus, et al., "Horizontal and Vertical Disparity, Eye Position, and Stereoscopic Slant Perception", Vision Research, vol. 39, 1999, 1143-1170.
Banks, et al., "Why is Spatial Stereoresolution So Low?", The Journal of Neuroscience, vol. 24, No. 9, Mar. 3, 2004, pp. 2077-2089.
Bereby-Meyer, et al., "Perception of Artificial Stereoscopic Stimuli from an Incorrect Viewing Point", Perception & Psychophysics, vol. 61, No. 8, 1999, pp. 1555-1563.
Blakemore, Colin, "The Range and Scope of Binocular depth Discrimination in Man", Journal of Physiology, vol. 211, Jun. 1, 1970, pp. 599-622.

(Continued)

*Primary Examiner* — Kenneth R Coulter
(74) *Attorney, Agent, or Firm* — Microsoft Corporation (57) ABSTRACT

A light-field display is provided that renders a light-field at one or more viewing apertures through a microlens array. The light-field display includes a display such as a monitor that is positioned behind the microlens array. The monitor and the microlens array are positioned so that light emitted from a pixel of the monitor reaches the one or more apertures through at most one microlens from the microlens array. For each microlens in the microlens array, the pixels of the monitor visible through that microlens of the microlens array at the one or more apertures is determined, and a light-field is then rendered at each of the one or more viewing apertures by rendering the determined pixels corresponding to each microlens.

20 Claims, 5 Drawing Sheets

OTHER PUBLICATIONS

Braunstein, et al., "Recovering Three-Dimensional Shape from Perspective Translations and Orthographic Rotations", J Exp Psychol Hum Percept Perform, vol. 19, No. 3, Jun. 1993, p. 1-1.
Buckley, et al., "Interaction of Stereo, Texture and Outline Cues in the Shape Perception of Three-Dimensional Ridges", Vision Research, vol. 33, No. 7, 1993, p. 1-1.
Burge, et al., "Ordinal Configural Cues Combine with Metric Disparity in Depth Perception", Journal of Vision, vol. 5, Jan. 19, 2005, pp. 534-542.
Caudek, et al., "Depth Perception in Motion Parallax and Stereokinesis", J Exp Psychol Hum Percept Perform, vol. 19, No. 1, Feb. 1993, p. 1-1.
Charman, et al., "Pupil Diameter and Depth-of-Field of Human Eye as Measured by Laser Speckle", Journal of Modern Optics, vol. 24, No. 12, Dec. 1977, p. 1-1.
Chen, et al., "Accommodation with Higher-Order Monochromatic Aberrations Corrected with Adaptive Optics", J Opt Soc Am A Opt Image Sci Vis, vol. 23, No. 1, Jan. 2006, p. 1-1.
Cheng, et al., "A Population Study on Changes in Wave Aberrations with Accommodation", Journal of Vision, vol. 4, Apr. 16, 2004, pp. 272-280.
Cochran, W. G., "Problems Arising in the Analysis of a Series of Similar Experiments", No. 1, p. 102, 1937.
Creem-Regehr, et al., "find-health-articles.com", "The Influence of Restricted Viewing Conditions on Egocentric Distance Perception: Implications for Real and Virtual Indoor Environments", vol. 34, No. 2, 2005, pp. 1-3.
Cumming, et al., "Disparity-Induced and Blur-Induced Convergence Eye-Movement and Accommodation in the Monkey", Journal of Neurophysiology, vol. 55, No. 5, 1986, pp. 1-3.
Domini, et al., "Perceiving Surface Slant from Deformation of Optic Flow", Journal of Experimental Psychology: Human Perception and Performance, vol. 25, No. 2, 1999, pp. 426-444.
Emoto, et al., "Repeated Vergence Adaptation Causes the Decline of Visual Functions in Watching Stereoscopic Television", Journal of Display Technology, vol. 1, No. 2, Dec. 2005, pp. 328-340.
Favalora, et al., "100 Million-Voxel Volumetric Display", Cockpit Displays IX: Displays for Defense Applications (of the SPIE's 16th Annual International Symposium on Aerospace/Defense Sensing, Simulation, and Controls), Apr. 2002, pp. 1-13.
Fincham F.M., "The Accommodation Reflex and its Stimulus", British Journal of Ophthalmology, vol. 35, Apr. 9, 1951, pp. 381-393.
Fincham, et al., "The Reciprocal Actions of Accommodation and Convergence", Journal of Physiology, vol. 137, Feb. 11, 1957, pp. 488-508.
Frisby, et al., "Evidence for Good Recovery of Lengths of Real Objects Seen with Natural Stereo Viewing", Perception, vol. 25, No. 2, 1996, p. 1-1.
Frisby, et al., "Interaction of Stereo and Texture Cues in the Perception of 3-Dimensional Steps", Vision Research, vol. 35, No. 10, May 1995, p. 1-1.
Garding, et al., "Stereopsis, Vertical Disparity and Relief Transformations", Nov. 1993, pp. 1-34.
Green, et al., "Depth of Focus, Eye Size and Visual Acuity", Vision Research, vol. 20, 1980, pp. 827-835.
Hillis, et al., "Are Corresponding Points Fixed?", Vision Research, vol. 41, No. 19, Sep. 2001, pp. 1-3.
Hillis, et al., "Slant from Texture and Disparity Cues: Optimal Cue Combination", Journal of Vision, vol. 4, 2004, pp. 967-992.
Hogervorst, et al., "Biases in Three-Dithensional Structure-From-Motion Arise from Noise in the Early Visual System", Proc. R. Soc. London. B, vol. 265, May 11, 1998, pp. 1587-1593.
Hogervorst, et al., "The Role of Perspective Effects and Accelerations in Perceived Three-Dimensional Structure-From-Motion", J Exp Psychol Hum Percept Perform, vol. 26, No. 3, Jun. 2000, p. 1-1.
Howard, et al., "Seeing in Depth", Jan. 30, 2008, p. 1-1.
Jacobs, Robert A., "Optimal Integration of Texture and Motion Cues to Depth", Vision Research, vol. 39, Mar. 1999, pp. 1-25.
Jin, et al., "Evaluating the Usability of an Auto-Stereoscopic Display", Human-Computer Interaction. Interaction Platforms and Techniques, vol. 4551, 2007, pp. 605-614.

Johnston, EB., "Systematic Distortions of Shape from Stereopsis", Vision Research, vol. 31, No. 7-8, 1991, p. 1-1.
Khosroyani, et al., "A Dual-Mode Dynamic Model of the Human Accommodation System", Bulletin of Mathematical Biology, vol. 64, 2002, pp. 285-299.
Knill, et al., "Do Humans Optimally Integrate Stereo and Texture Information for Judgments of Surface Slant?", Vision Research, vol. 43, Dec. 2, 2002, pp. 2539-2558.
Kool, et al., "Visual Comfort of Binocular and 3D Displays", vol. 25, Jan. 9, 2004, pp. 99-108.
Krishnan, et al., "Dynamic Measures of Vergence Accommodation", Am J Optom Physiol Opt, vol. 54, No. 7, Jul. 1977, p. 1-1.
Hidenori, et al., "Effect on Depth Perception by a Blur in a Depth-Fused 3-D Display", Journal of the Institute of Image Information and Television Engineers, vol. 60, No. 3, 2006, p. 1-1.
Loomis, et al., "Visual Space Perception and Visually Directed Action", Journal of Experimental Psychology: Human Perception and Performance, vol. 18, No. 4, 1992, pp. 906-921.
Loomis, et al., "Relative Motion Parallax and the Perception of Structure from Motion", Proceedings of the Workshop on Visual Motion, Mar. 20-22, 1989 pp. 204-211.
Lucente, Mark., "Interactive Three-Dimensional Holographic Displays: Seeing the Future in Depth", ACM SIGGRAPH Computer Graphics, vol. 31, No. 2, May 1997, pp. 1-17.
Marshall, et al., "Occlusion Edge Blur: A Cue to Relative Visual Depth", Journal of the Optical Society of America A, vol. 13, Apr. 1996, pp. 1-14.
Mather, G., "The Use of Image Blur as a Depth Cue", Perception, vol. 26, No. 9, 1997, p. 1-1.
Mather, et al., "Depth Cue Integration: Stereopsis and Image Blur", Vision Research, vol. 40, No. 25, 2000, p. 1-1.
Mather, et al., "Blur Discrimination and its Relation to Blur-Mediated Depth Perception", Perception, vol. 31, No. 10, p. 1-1, 2002.
Mathews, et al., "Spatiotemporal Transfer Function of Human Accommodation", Vision Research, vol. 34, No. 15, Aug. 1994, p. 1-1.
McQuaide, Sarah C., "Three-Dimensional Virtual Retinal Display Using a Deformable Membrane Mirror", Master of Science in Mechanical Engineering, University of Washington, pp. 1-48, 2012.
Menozzi, Marino, "Visual Ergonomics of Head-Mounted Displays", Japanese Psychological Research, vol. 42, No. 4, Dec. 19, 2002, p. 1-1.
Miles, et al., "Optically Induced Changes in the Couplings between Vergence and Accommodation", The journal of Neuroscience, vol. 7, No. 6, Aug. 1987, pp. 2576-25.
Mon_Williams, et al., "Ordinal Depth Information from Accommodation?", Ergonomics, vol. 43, No. 3, Mar. 2000, p. 1-1.
Mon_Williams, et al., "Vergence Provides Veridical Depth Perception from Horizontal Retinal Image Disparities", Exp Brain Res, Jul. 5, 2000, p. 1-1.
Odom, et al., "Symmetrical Refractive Error Elevates Stereo Thresholds", Proceedings of the Annual International Conference of the IEEE on Engineering in Medicine and Biology Society, vol. 14, Oct. 29-Nov. 1, 1992, pp. 1674-1675.
Okada, et al., "Target Spatial Frequency Determines the Response to Conflicting Defocus- and Convergence-Driven Accommodative Stimuli", Vision Research, vol. 46, No. 4, Feb. 2006, p. 1-1.
Owens D. A., "ScienceDirect", "A Comparison of Accommodative Responsiveness and Contrast Sensitivity for Sinusoidal Gratings", Vision Research, vol. 20, No. 2, 1980, pp. 1-2.
Paap, et al., "Perceptual Consequences of Potentiation in the Extraocular Muscles: Alternative Explanation for Adaptation to Wedge Prisms", J Exp Psychol Hum Percept Perform, vol. 2 No. 4, 1976, p. 1-1.
Rolland, et al., "Dynamic Focusing in Head-Mounted Displays",Proc. SPIE, vol. 3639, 1999, p. 1-1.
Sahm, et al., "Throwing Versus Walking as Indicators of Distance Perception in Similar Real and Virtual Environments", First SIGGRAPH Symposium on Applied Perception in Graphics and Visualization, Aug. 7-8, 2004, p. 1-1.
Schor, et al., "Binocular Sensory Fusion is Limited by Spatial Resolution", Vision Research, vol. 24, No. 7, 1984, p. 1-1.

Schor, et al., "Fatigue of Accommodation and Vergence Modifies their Mutual Interactions", Investigative Ophthalmology & Visual Science, vol. 28, 1987, pp. 1250-1259.

Schowengerdt, et al., "True 3-D Scanned Voxel Displays Using Single or Multiple Light Sources", Journal of the Society for Information Display, vol. 14, No. 2, Feb. 2006, p. 1-1.

Semmlow, et al., "Dynamic Contributions of the Components of Binocular Vergence", J Opt Soc Am, May 1979, vol. 69, No. 5, p. 1-1.

Sheedy, et al., "Performance and Comfort on Near-Eye Computer Displays", Optometry and Vision Science, vol. 79, No. 5, May 2002, pp. 306-312.

Sullivan, Alan., "DepthCube Solid-State 3D Volumetric Display", Proceedings of the SPIE, vol. 5291, Jun. 24, 2004, p. 1-1.

"SID", "A New Method for Protruding Apparent 3-D Images in the DFD (Depth-Fused 3-D) Display", SID Symposium, retrieved at << Digest of Technical Papers, vol. 32, No. 1, Jun. 2001, p. 1-1.

Hideaki, Takada., "The Progress of High Presence and 3D Display Technology. The Depth-Fused 3-D Display for the Eye Sweetly", Optical and Electro-Optical Engineering Contact, vol. 44, No. 6, 2006, p. 1-1.

Takaki, Yasuhiro., "Novel 3D Display Using an Array of LCD Panels", Proc. SPIE, vol. 5003, No. 1, 2003, p. 1-1.

Thibos, et al., "Statistical Variation of Aberration Structure and Image Quality in a Normal Population of Healthy Eyes", Journal of the Optical Society of America, Jul. 13, 2001, pp. 1-36.

Todd, James T., "The Visual Perception of 3D Shape", Trends in Cognitive Sciences, vol. 8, No. 3, Mar. 2004, pp. 115-121.

Todd, et al., "The Perception of 3-Dimensional Affine Structure from Minimal Apparent Motion Sequences", Percept Psychophys, vol. 48, No. 5, Nov. 1990, p. 1-1.

Torii, et al., "Dynamic Measurement of Accommodative Responses While Viewing Stereoscopic Images", Journal of Modern Optics, vol. 55, No. 4-5, Feb. 2008, p. 1-1.

Tucker, et al., "Modulation Dependence of the Accommodation Response to Sinusoidal Gratings", Vision Research, vol. 26, No. 10, 1986, p. 1-1.

Ukai, et al., "Visual Fatigue Caused by Viewing Stereoscopic Images and Mechanism of Accommodation", Displays, vol. 29, 2008, pp. 106-116.

Vishwanath, et al., "Why Pictures Look Right When Viewed from the Wrong Place", Nature Neuroscience, vol. 8, 2005, pp. 1-2.

Walsh, et al., "Visual Sensitivity to Temporal Change in Focus and its Relevance to the Accommodation Response", Vision Research, vol. 28, No. 11, 1988, p. 1-1.

Wann, et al., "Health Issues with Virtual Reality Displays: What We Do Know and What We Don't", Computer Graphics, May 1997, pp. 53-57.

Warm, et al., "Measurement of Visual Aftereffects Following Virtual Environment Exposure", Handbook of Virtual Environments: Design, Implementation, and Applications, 2002, pp. 731-749.

Ward. P.A., "The Effect of Spatial Frequency on Steady-State Accommodation", Ophthalmic and Physiological Optics, vol. 7, No. 3, Dec. 19, 2007, p. 1-1.

Watt, et al., "Focus Cues Affect Perceived Depth", Journal of Vision, Apr. 28, 2005, pp. 834-862.

Westheimer, et al., "Stereoscopic Acuity with Defocused and Spatially Filtered Retinal Images", J. Opt. Soc. Am, vol. 70, No. 7, 1980, pp. 1-2.

Wichmann, et al., "The Psychometric Function: I. Fitting, Sampling, and Goodness of Fit", Perception & Psychophysics, vol. 63, No. 8, Nov. 2001, pp. 1293-1313.

Wichmann, et al., "The Psychometric Function: II. Bootstrap-Based Confidence Intervals and Sampling", Perception & Psychophysics, vol. 63, No. 8, Nov. 2001, p. 1-1.

Willemsen, et al., "Effects of Stereo Viewing Conditions on Distance Perception in Virtual Environments", UUCS-05-003, University of Utah, Feb. 15, 2005, pp. 1-9.

IC, Wood., "Stereopsis with Spatially Degraded Images", Ophthalmic Physiol Opt, vol. 3, No. 3, p. 1-1, 1983.

Yano, et al., "Two Factors in Visual Fatigue Caused by Stereoscopic HDTV Images", Proceedings of the SPIE, vol. 4864, 2002, p. 1-1.

Yano, et al., "A Study of Visual Fatigue and Visual Comfort for 3D HDTV/HDTV Images", Displays, vol. 23, No. 4, Sep. 2002, pp. 1-5.

Hoffman, et al., "Vergence—accommodation conflicts hinder visual performance and cause visual fatigue", Journal of Vision, vol. 8, No. 3, Nov. 3, 2007, pp. 1-30.

Lee, Byoungho., "Current status of integral imaging after 100 years of history", School of Electrical Engineering, Seoul National University, Oct. 16, 2008, pp. 1-51.

Ng, Ren, "Fourier Slice Photography", ACM Transactions on Graphics, vol. 24, No. 3, Jul. 2005, pp. 735-744.

* cited by examiner

LIGHT-FIELD DISPLAY

BACKGROUND

A three-dimensional (3-D) display is a display that enhances viewer perception of depth by stimulating stereopsis, motion parallax, or both. Stereopsis provides different images to the two eyes, such that retinal disparity indicates simulated depth. Motion parallax changes the images viewed by the eyes as a function of the position of the eyes, again such that simulated depth is indicated.

3-D displays are useful for many applications including vision research, operation of remote devices, medical imaging, surgical training, scientific visualization, virtual prototyping, and more. These 3-D displays typically render a light-field to a viewer that includes a 3-D scene or image. For example, a surgical training application may render a 3-D light-field that includes a particular part of the anatomy.

In many of these applications, it is useful to render a faithful impression of the 3-D structure of the portrayed object in the light-field. However, 3-D displays often yield distortions in a perceived light-field compared with the actual light-field that the 3-D display purports to represent. A cause of the distortions is that computer displays typically present images on one surface. For example, a typical computer display is a monitor having a flat display surface. A 3-D light-field is generated by illumination from the surface of the monitor. In order to view the light-field, the user focuses on the surface of the monitor, rather than at the depths of the virtual objects portrayed by the light-field. Thus, focus cues in the 3-D light-field displayed on the monitor specify the depth of the monitor, rather than depths in the depicted scene.

SUMMARY

A light-field display is provided that renders a light-field at one or more viewing apertures through a microlens array. The light-field display includes a display such as a monitor that is positioned behind the microlens array. The monitor and the microlens array are positioned so that light emitted from a pixel of the monitor reaches each of the one or more apertures through at most one microlens from the microlens array. For each microlens in the microlens array, the pixels of the monitor visible through that microlens of the microlens array at the one or more apertures are determined, and a light-field is then rendered at each of the one or more viewing apertures by rendering the determined pixels corresponding to each microlens. As the position of the one or more viewing apertures change in the light-field display, the pixels that are visible at the one or more apertures through each individual microlens may be re-determined, and the pixels may be re-rendered. Thus, the assignment of pixels to microlenses is not static, and is dynamically assigned according to the positions of the one or more apertures.

In an implementation, a microlens array may be positioned in front of a display at a separation distance. A location of a first viewing aperture in front of the microlens array may be determined. A location of a second viewing aperture in front of the microlens array may be determined. For each microlens in the microlens array, pixels of the display that are visible at the first viewing aperture through that microlens of the microlens array may be determined. For each microlens in the microlens array, pixels of the display that are visible at the second viewing aperture through that microlens of the microlens array may be determined. For each microlens, the determined pixels that are visible at the first viewing aperture through that microlens of the microlens array and the determined pixels that are visible at the second viewing aperture through that microlens of the microlens array may be alternatively rendered (e.g., because the determined pixels may be the same pixels, since in an implementation, all or almost all of the pixels may be visible within each aperture). The first and second viewing apertures may correspond to a first aperture and a second aperture of a pair of glasses. The first aperture of the glasses may be closed during the rendering for the second viewing aperture, and the second aperture of the glasses may be closed during the rendering for the first viewing aperture. A location signal may be received from the glasses, and the location of the first aperture may be determined from the location signal. The pixels of the display that are visible at the first viewing aperture through each microlens of the microlens array may be determined by ray tracing from the first viewing aperture through the microlens of the microlens array.

In an implementation, a microlens array may be positioned in front of a display device at a microlens separation. A location of a first viewing aperture in front of the microlens array may be determined. For each microlens, pixels of the display that are visible at the first viewing aperture through that microlens of the microlens array may be determined. For each microlens, the determined pixels may be rendered to display a portion of a light-field at the first viewing aperture through that microlens of the microlens array. A location of a second viewing aperture in front of the microlens array may be determined. For each microlens, pixels of the display that are visible at the second viewing aperture through that microlens of the microlens array may be determined. For each microlens, the determined pixels may be rendered to display a portion of the light-field at the second viewing aperture through that microlens of the microlens array. The first and second viewing apertures may correspond to a first aperture and a second aperture of a pair of glasses. A location signal may be received from the glasses and the location of the first aperture may be determined from the location signal. The pixels of the display that are visible at the first viewing aperture through a microlens may be determined by ray tracing from the first viewing aperture through the microlens of the microlens array.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
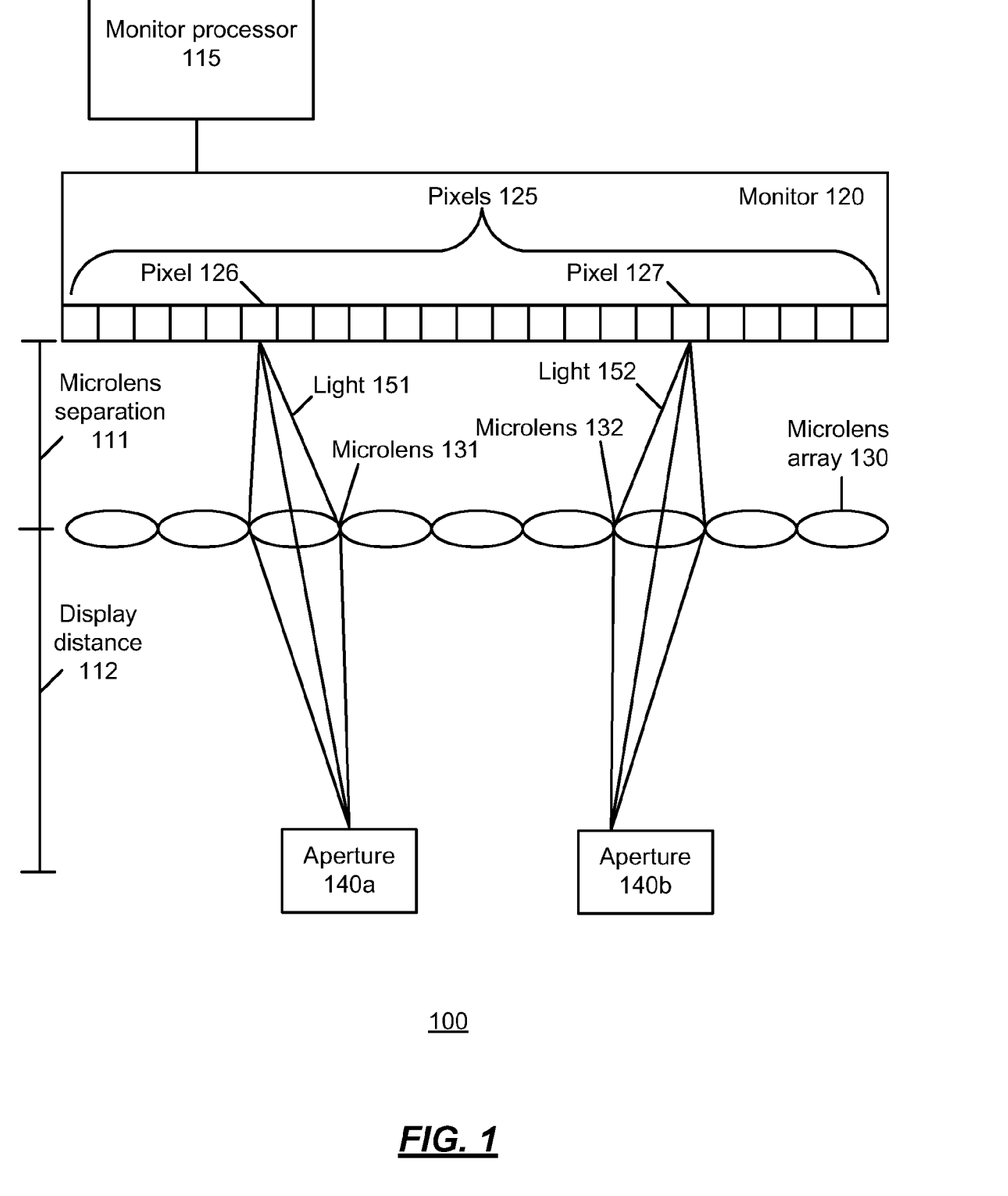
FIG. 1 is an illustration of a top view of an implementation of a light-field display.

FIG. 1 is an illustration of a top view of an implementation of a light-field display 100. The light-field display 100 may include a monitor 120. The monitor 120 may be implemented using a variety of known display types including, but not limited to, cathode ray tube displays, liquid crystal displays, plasma displays, and rear projection displays. Any known display type may be used. The particular components and features shown in FIG. 1 are not shown to scale with respect to one another.

The monitor 120 may include a plurality of pixels 125. The pixels 125 of the monitor 120 represent the smallest unit of the monitor 120 that may be activated independently. For example, each of the pixels 125 may be independently controlled and set to output light at a particular color and intensity. While only a certain number of pixels 125 are shown in FIG. 1, it is for illustrative purposes only; any number of pixels 125 may be supported by the monitor 120. In addition, because FIG. 1 represents a top view of the light-field display 100, there may be additional rows of pixels 125 that are not visible in FIG. 1. For example, in some implementations, the monitor 120 may have a pixel resolution of 1280×1024 pixels. Other resolutions may also be used.

The pixels 125 may have an associated diameter. The diameter of each of the pixels 125 may be uniform and depend on the underlying technology of the monitor 120. For example, where the monitor 120 is an LCD display, the diameters of the pixels 125 may be 0.125 mm. While the pixels 125 are described as having a diameter, this is not meant to imply that the pixels 125 are limited to shapes that are circular or near-circular. The pixels 125 may be any of a variety of shapes including round, oval, rectangular, square, and near-square, for example.

The light-field display 100 may further include viewing apertures 140a and 140b. The viewing apertures 140a and 140b may be used to view a light-field generated by the light-field display 100. In some implementations, the viewing apertures 140a and 140b may correspond to the eyes of a viewer. For example, the viewing aperture 140a may correspond to a left eye of the viewer and the viewing aperture 140b may correspond to a right eye of the viewer. In some implementations, the viewing apertures 140a and 140b may not have physical boundaries but may be "virtual" and correspond to a region of space in the light-field display through which a correct light-field may be viewed. While only two apertures 140a and 140b are shown in FIG. 1, it is for illustrative purposes only. Any number of apertures may be supported by the light-field display 100.

In some implementations, the viewing apertures 140a and 140b may have a diameter that is sized to accommodate the size range of the human pupil. For example, human pupil diameters are typically in the range of 2 mm to 6 mm. Thus, including sufficient extra space to accommodate fully expanded pupils, the diameters of the viewing apertures may be approximately 10 mm. Other sized viewing apertures 140a and 140b may be used.

In some implementations, the locations of the viewing apertures 140a and 140b in the light-field display may be fixed. In particular, the display distance 112 may be a fixed distance. For example, the viewing apertures 140a and 140b may correspond to viewing holes through which the viewer may view a light-field. The viewing holes may be integrated into the light-field display 100, for example.

In other implementations, the viewing apertures 140a and 140b may be moveable with respect to the light-field display 100. The viewing apertures 140a and 140b may be moveable in three dimensions, or limited to two dimensions. For example, the display distance 112 may be generally fixed, but the apertures 140a and 140b may otherwise move left, right, up, and down while the display distance 112 is generally maintained.

The light-field display 100 may comprise a microlens array 130. The microlens array 130 may comprise a plurality of microlenses, including microlenses 131 and 132. While the microlens array 130 shown comprises a certain number of microlenses, it is for illustrative purposes only; any number of microlenses may be used in the microlens array 130. In addition, as described above, because FIG. 1 is a top view of the of the light-field display 100, there may be additional rows of microlenses in the microlens array 130 that are not visible in FIG. 1. Further, the microlenses of the microlens 130 array may be packed or arranged in a variety of patterns, including a hexagonal, octagonal, or other shaped grid.

The microlens array 130 may be positioned in front of the monitor 120. The distance between the monitor 120 and the microlens array 130 is referred to as the microlens separation 111. The microlens separation 111 may be chosen such that light emitting from each of the pixels 125 passes through each of the microlenses of the microlens array 130. The microlenses of the microlens array 130 may be selected such that light passing from each individual pixel of the monitor 120 is viewable at each aperture 140a and 140b through only one of the microlenses of the microlens array 130. While light from the individual pixels may pass through each of the microlenses in the microlens array 130, the light from a particular pixel may only be visible at each aperture 140a and 140b through at most one microlens. Further, the microlens that the particular pixel is visible through may be different for each aperture 140a and 140b.

For example, as illustrated in FIG. 1, light 151 from a first pixel 126 is viewable through the microlens 131 at the aperture 140a at the display distance 112. Similarly, light 152 from a second pixel 127 is viewable through the microlens 132 at the aperture 140b at the display distance 112. While light from the pixels 126 and 127 passes through the other microlenses in the microlens array 130 (not shown), only the light 151 and 152 from the pixels 126 and 127 that pass through the microlenses 131 and 132 are visible at the viewing apertures 140a and 140b. Note, that light from pixel 126 may also be visible at aperture 140b through a microlens and light from pixel 127 may also be visible at aperture 140a through a microlens. As will be described later, the apertures 140a and 140b may be alternatively closed and opened during alternative pixel renderings for the apertures 140a and 140b, for example.

In some implementations, the relationships between the selected microlens separation 111, the selected display distance 112, the selected diameter and focus length of the microlenses of the microlens array 130, and the selected diameter of the pixels 125 may be described by one or more following formulas.

A variable k may represent the square root of a number of pixels 125 that may illuminate (i.e., be visible from) either of the apertures 140a and 140b through a single microlens of the microlens array 130. Thus the value of k may be described by the formula: k=2×(aperture diameter/minimum pupil diameter). Thus, k may equal 2×(10 mm/2 mm), i.e., 10.

A variable q may represent the Nyquist spatial frequency (i.e., the maximum angular rate of intensity variation that may be correctly portrayed to a viewpoint within an aperture) and may include the range of special frequencies that are known to stimulate human accommodation (e.g., focus adjustment for the eyes). This range is known to be approximately 4 to 8 cycles per degree. In some implementations, a conservative estimate of 20 cycles per degree may be selected. Thus, q=20 cycles per degree. Other values may also be selected for q.

As described above, the microlenses of the microlens array 130 have the property that no pixel is visible at each of the viewing apertures 140a and 140b through more than one microlens. Thus, the diameter of the microlenses of the microlens array 130 may be represented by the formula: microlens diameter=k×pixel diameter. Thus, given the pixel diameter of 0.125 mm and a k value of 10, the microlens diameter may be 1.25 mm, for example. Other, values for the microlens diameter may be used, and in some implementations may be smaller than k×the pixel diameter.

The display distance 112 may be defined by the formula: display distance 112=the microlens diameter/(tan(1/(2×q))). Thus, in some implementations, for a microlens diameter of 1.25 mm and a q of 20 cpd, the display distance 112 may be 2.86 m, for example.

The microlens separation 111 may be defined by the formula: microlens separation 111=(display distance×microlens diameter)/aperture diameter. Thus, in some implementations, for a display distance of 2.86 m, a microlens diameter of 1.25 mm and an aperture diameter of 10 mm, the microlens separation 111 may be 0.358 m, for example.

The focal length of the microlenses of the microlens array 130 may be chosen to focus light at the apertures 140a and 140b at the display distance 112. Thus, the focal length may selected according to the formula: focal length=1/((1/display distance)+(1/microlens separation)). In some implementations, given the display distance 112 of 2.86 m and the microlens separation 111 of 0.358 m, the focal length may be 0.318 m, for example.

A monitor processor 115 may control the light output of the pixels 125, such as the light 151 of the first group of pixels 126 and the light 152 of the second group of pixels 127. The light output may include the color and intensity of the light displayed by each pixel. The monitor processor 115 may also track the location of the apertures 140a and 140b in the light-field display 100, and given the location of the apertures 140a and 140b, for each microlens in the microlens array 130, adjust the output of the pixels 125 viewable through the microlens at the apertures 140a and 140b such that a particular light-field is viewed at the apertures 140a and 140b. The light-field may be a 3-D image or scene, for example. In some implementations, the image or scene may be part of a 3-D video such as a 3-D movie or television broadcast, for example. A variety of sources may provide the light-field to the monitor processor 115.

The monitor processor 115 may track and/or determine the location of the apertures 140a and 140b in the light-field display 100. In some implementations, the monitor processor 115 may track the location of the apertures 140a and 140b using location and/or tracking devices associated with the apertures 140a and 140b. For example, the apertures 140a and 140b may have tracking devices attached to them that may transmit location signals (through a wire or wirelessly) to the monitor processor 115. The monitor processor 115 may receive the location signals and may use the location signals to determine the locations of the apertures 140a and 140b in the light-field display 100. Any system, method, or technique known in the art for determining a location may be used.

Where the locations of the apertures 140a and 140b are fixed, the monitor processor 115 may determine the location of the apertures 140a and 140b by referencing a stored file or variable, for example.

The monitor processor 115 may determine, for each microlens, which of the pixels 125 are visible from the apertures 140a and 140b through that microlens given the determined locations of the apertures 140a and 140b. In some implementations, the monitor processor 115 may determine the pixels that are visible from the apertures 140a and 140b through each individual microlens in the microlens array 130 given the locations of the apertures 140a and 140b by ray tracing from the apertures 140a and 140b through each of the microlenses of the microlens array 130 and determining which of the pixels 125 are reachable by the rays through each individual microlens. Other techniques may also be used.

In some implementations, the pixels that are visible through each individual microlens of the microlens array 130 may have been pre-computed for a variety of aperture 140a and 140b positions. For example, the ray tracing may be performed for a variety of aperture 140a and 140b positions in the light-field display 100. The pixels that are visible through each individual microlens of the microlens array 130 at the various positions may be determined and stored as a table or other data structure. The monitor processor 115 may determine the location of the apertures 140a and 140b, and may reference the table to determine, for each microlens, which of the pixels 125 are visible through that microlens of the microlens array 130 for the determined locations of the apertures 140a and 140b.

Figure 2:
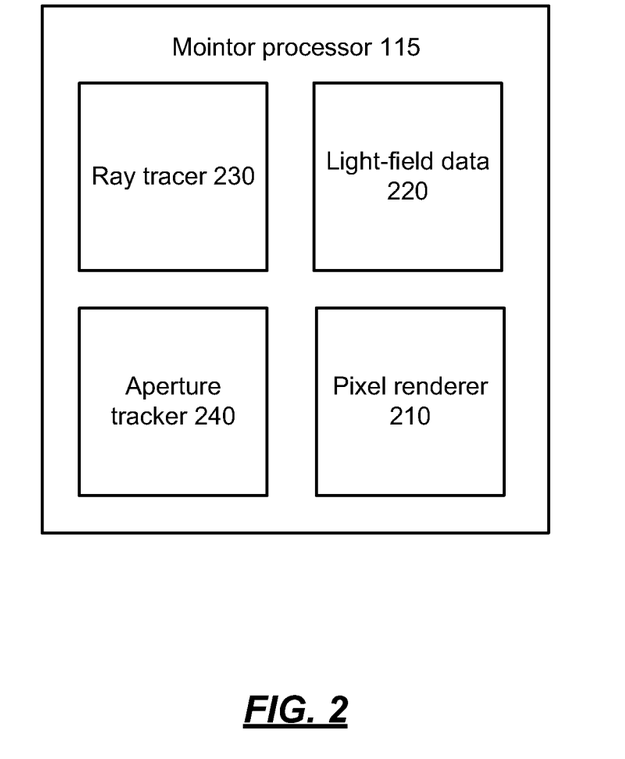
FIG. 2 is a block diagram of an implementation of a monitor processor.

FIG. 2 is a block diagram of an implementation of a monitor processor 115. The monitor processor 115 may be implemented using a computing device such as the computing device 500 described below with respect to FIG. 5. The monitor processor 115 may include a variety of components including an aperture tracker 240. The aperture tracker 240 may determine a location of one or more apertures (e.g., apertures 140a and 140b) in the light-field display 100. In some implementations, the aperture tracker 240 may receive location information from a tracker or other location device associated with one or more of the apertures. For example, the apertures 140a and 140b may be implemented using specialized glasses or goggles. A pair of glasses may transmit location information to the aperture tracker 240, which may then use the tracking information to calculate or otherwise determine the location of the apertures 140a and 140b in the light-field display 100. Any system, method, or technique for determining the location of the apertures 140a and 140b may be used.

The monitor processor 115 may further include a ray tracer 230. The ray tracer 230 may determine which ones of the pixels 125 of the monitor 120 are visible through each individual microlens of the microlens array 130 from one or more apertures in the light-field display given the location of the one or more apertures in the light-field display as determined by the aperture tracker 240.

In some implementations, the ray tracer 230 may determine which of the pixels 125 are visible through each individual microlens of the microlens array 130 by performing ray tracing from the determined location of the one or more apertures in the light-field display 100 through each microlens of the microlens array 130, and determining the pixels that are reached by the rays for each individual microlens. The pixels that can be reached by a ray originating from an aperture through a microlens of the microlens array 130 are the pixels that are visible through that microlens. In some implementations, the ray tracer 230 may perform the ray tracing determination. In other implementations, the ray tracing determinations may have been previously computed for a variety of aperture locations in the light-field display and stored as a table or other data structure. The ray tracer 230 may then determine the pixels that are visible through each individual microlens of the microlens array 130 at an aperture by referencing the table using the location of the aperture provided by the aperture tracker 240, for example.

In other implementations, rays may be traced from each of the pixels 125 through the microlenses of the microlens array 130 to the apertures 140a and 140b. For example, for each of the pixels 125 a ray may be traced through the center of an aperture. The intersection of the ray with the microlens array 130 is determined, and the microlens of the microlens array 130 that is closest to the intersection is determined. A ray may then be traced through the center of the determined microlens from the pixel, and if the ray intersects the aperture, then the pixel is visible through the determined microlens at the aperture. The rays may be traced from various locations within the pixel, and if no ray intersects the aperture, then that pixel is not visible at the aperture.

The monitor processor 115 may comprise light-field data 220. The light-field data 220 may include a geometric description of a 3-D image or scene for the light-field display 100 to display to a viewer at one or more viewing apertures (e.g., apertures 140a and 140b). In some implementations, the light-field data 220 may be a stored or recorded 3-D image or video. In other implementations, the light-field data 220 may be the output of a computer, video game system, or set-top box, etc. For example, the light-field data 220 may be received from a video game system outputting data describing a 3-D scene. In another example, the light-field data 220 may be the output of a 3-D video player processing a 3-D movie or 3-D television broadcast.

The monitor processor 115 may comprise a pixel renderer 210. The pixel render 210 may control the output of the pixels 125 so that a light-field described by the light-field data 220 is displayed to a viewer of the light-field display 100. The pixel renderer 210 may use the output of the ray tracer 230 (i.e., the pixels that are visible through each individual microlens of the microlens array 130 at the viewing apertures 140a and 140b) and the light-field data 220 to determine the output of the pixels 125 that will result in the light-field data 220 being correctly rendered to a viewer of the light-field display 100. For example, the pixel renderer 210 may determine the appropriate color and intensity for each of the pixels 125 to render a light-field corresponding to the light-field data 220.

For example, for opaque scene objects, the color and intensity of a pixel may be determined by the pixel renderer 210 by determining by the color and intensity of the scene geometry at the intersection point nearest the aperture of a ray from the pixel that passes through the microlens array. Computing this color and intensity may be done using a variety of known techniques. In the case of geometry that is not opaque, the ray color and intensity may be determined using a summation of the colors and intensities of the geometry along the path of intersections of the ray. This calculation may be done using a variety of known techniques.

In some implementations, the pixel renderer 210 may stimulate focus cues in the pixel rendering of the light-field. For example, the pixel renderer 210 may render the light field data to include focus cues such as accommodation and the gradient of retinal blur appropriate for the light-field based on the geometry of the light-field (e.g., the distances of the various objects in the light-field) and the display distance 112. Any system, method, or techniques known in the art for stimulating focus cues may be used.

In some implementations, the pixel renderer 210 may alternate between a pixel rendering for multiple viewing apertures (e.g., viewing apertures 140a and 140b). Because the viewing apertures 140a and 140b are at different locations in the light-field display 100, the output of the pixels corresponding to the light-field data 220 may be different because the pixels 125 that are visible through each individual microlens at the apertures 140a and 140b may be different. Thus, the pixel renderer 210 may render the light-field data 220 differently for the viewing aperture 140a than for the viewing aperture 140b.

In some implementations, the pixel renderer 210 may rapidly alternate between a pixel rendering for the viewing aperture 140a and a pixel rendering for the viewing aperture 140b. For example, the pixel renderer 210 may alternate between the rendering for the viewing aperture 140a and the viewing aperture 140b at a rate of every 1/100 of a second. Other rates may also be used. In some implementations, the viewing apertures 140a and 140b may correspond to lenses of specialized glasses or eyewear. The lenses of the pair of glasses may include shutters that close or block a viewing aperture when the pixel renderer 210 is rendering the light-field data 220 for another viewing aperture. For example, when the pixel renderer 210 is rendering the light-field data 220 for the viewing aperture 140a, a shutter corresponding to the viewing aperture 140a is opened, and a shutter corresponding to the viewing aperture 140b is closed. Conversely, when the pixel renderer 210 is rendering the light-field data 220 for the viewing aperture 140b, the shutter corresponding to the viewing aperture 140a is closed, and the shutter corresponding to the viewing aperture 140b is opened.

Other methods and techniques for ensuring that the apertures 140a and 140b receive alternating renderings of the pixels may be used. For example, in one implementation, viewers may wear a pair of glasses where each lens is separately polarized to receive different orientations of light waves. The pixel rendering for the aperture 140a may be displayed at a polarity that matches the left lens, and the pixel rendering for the aperture 140b may be displayed at a polarity that matches the right lens. Because of the polarization, a viewer looking through a particular lens may only see light having the same polarity as the corresponding lens.

While the pixel renderer 210 is described as supporting only two viewing apertures 140a and 140b, it is for illustrative purposes only. There is no limit to the number of viewing apertures that may be supported. For example, in a light-field display 100 having four viewing apertures, the pixel renderer 210 may rapidly alternate between four renderings of the light-field data 220.

Figure 3:
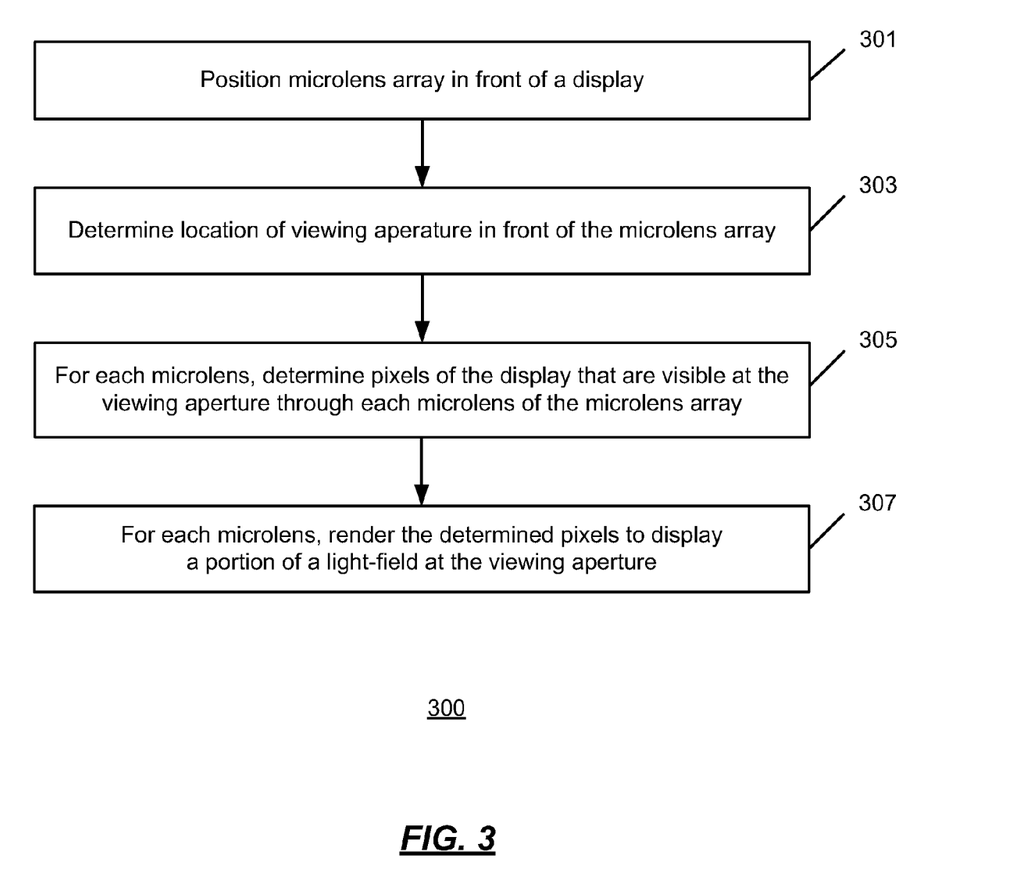
FIG. 3 is an operational flow of an implementation of a method for operating a light-field display.

FIG. 3 is an operational flow of an implementation of a method 300 for operating a light-field display. The method 300 may be implemented by the light-field display 100 illustrated in FIG. 1, for example.

A microlens array may be positioned in front of a display (301). The microlens array may be a microlens array such as the microlens array 130 and may be positioned in front of a display such as the monitor 120. The microlens array 130 may be separated from the monitor 120 by a microlens separation 111.

The focal length of the microlenses in the microlens array 130 may be chosen such that the light emitted from a pixel of the monitor 120 is focused at a display distance (e.g., the display distance 112). In addition, the microlenses of the microlens array 130 may be arranged and chosen such that for any pixel of the monitor 120, the pixel is visible from a viewing aperture at the display distance 112 though only a single microlens.

A location of a viewing aperture in front of the microlens array may be determined (303). The location of the viewing aperture may be determined by the aperture tracker 240 of the monitor processor 115, for example. In some implementations, the location of the viewing aperture may be determined by a tracking device associated with the viewing aperture. The tracking device may transmit a signal to the light-field display 100 to the aperture tracker 240. The aperture tracker 240 may then determine the location of the viewing aperture using the received signal. Other methods for determining the location of the viewing aperture may be used such a camera or ultrasound device. In other implementations, the location of the viewing aperture in the light-field display 100 may be fixed and the location of the viewing aperture may then be determined by the aperture tracker 240 by referencing a variable or file specifying the fixed location of the viewing aperture.

For each microlens, pixels of the display that are visible at the viewing aperture through the individual microlens of the microlens array may be determined (305). The visible pixels may be determined for each microlens by the ray tracer 230 of the monitor processor 115, for example. In some implementations, the visible pixels for a microlens may be determined by ray tracing from the location of the viewing aperture through the microlens of the microlens array 130 and to the pixels 125 of the monitor 120. For example, multiple rays of light may be traced from the viewing aperture through each of the microlenses of the microlens array 130. The particular pixels of the monitor 120 that are reachable through a microlens of the microlens array 130 by a light ray may be determined to be viewable through that microlens.

In some implementations, the ray tracer 230 may perform the ray tracing using the determined location of the viewing aperture. In other implementations, the ray tracing may have been performed previously for a variety of viewing aperture positions and stored in a table or other data structure. The ray tracer 230 may determine the pixels that are visible through each individual microlens in the microlens array 130 by referencing the stored table, for example.

For each microlens, the determined pixels may be rendered to display a portion of a light-field at the viewing aperture (307). The pixels 125 of the monitor 120 may be rendered by the pixel renderer 210 of the monitor processor 115, for example. In some implementations, the pixel renderer 210 may render a light-field corresponding to light-field data 220. The light-field data 220 may correspond to a 3-D image or 3-D video. For example, the light-field data 220 may correspond to the output of 3-D computer application.

In some implementations, the pixel renderer 210 may determine the pixels 125 to illuminate for each microlens based on the pixels that are visible at the viewing aperture through that microlens of the microlens array 130 as determined by the ray tracer 230. As described above, each pixel may be visible at a viewing aperture through at most one microlens. The pixel renderer 210 may transform the light-field data 220 to account for the location of the viewing aperture and the pixels that are visible through individual microlenses at the location of the viewing aperture, and illuminate the pixels 125 such that the viewer at the viewing aperture correctly perceives the light-field corresponding to the light-field data 220.

Figure 4:
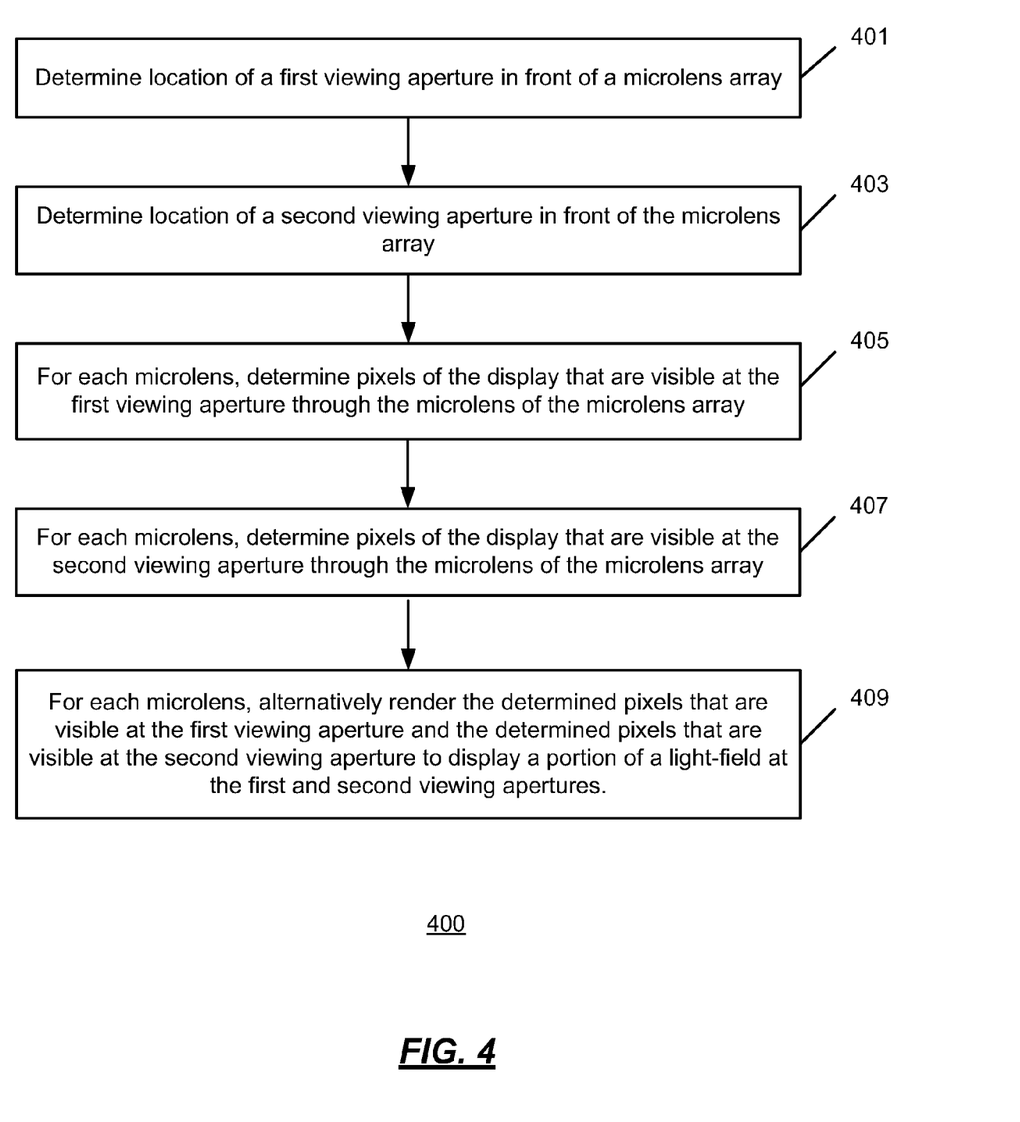
FIG. 4 is an operational flow of an implementation of a method for operating a light-field display with multiple viewing apertures.

FIG. 4 is an operational flow of an implementation of a method 400 for operating a light-field display with multiple viewing apertures. The method 400 may be implemented by the light-field display 100 illustrated in FIG. 1, for example.

A location of a first viewing aperture in front of a microlens array may be determined (401). The location of the first viewing aperture may be determined by the aperture tracker 240 of the monitor processor 115, for example. In some implementations, the location of the first viewing aperture may be determined by a tracking device associated with the first viewing aperture. The tracking device may transmit a location signal to the aperture tracker 240. The aperture tracker 240 may then determine the location of the first viewing aperture using the received signal. Other methods for determining the location of the first viewing aperture may be used. In other implementations, the location of the first viewing aperture in the light-field display 100 may be fixed and the location of the first viewing aperture may then be determined by the aperture tracker 240 by referencing a variable or file specifying the fixed location of the first viewing aperture.

A location of a second viewing aperture in front of the microlens array may be determined (403). The location of the second viewing aperture may be determined by the aperture tracker 240 of the monitor processor 115, for example. In some implementations, the first viewing aperture and the second viewing aperture may correspond to a left and right eye of a viewer. The first and second viewing apertures may be approximately ten millimeters. Other sizes may be used for the first and second viewing apertures.

In some implementations, the first and second viewing apertures may be the left and right apertures of a pair of glasses or goggles used by a viewer to view the light-field display 100. The pair of glasses may have an integrated tracking device that allows the location of the first and second apertures to be determined. The pair of glasses may be wired to the aperture tracker 240 of the monitor processor 115, or may be wireless, for example.

For each microlens, pixels of the display that are visible at the first viewing aperture through the individual microlens of the microlens array may be determined (405). The pixels visible through each microlens at the first viewing aperture may be determined by the ray tracer 230 of the monitor processor 115, for example. In some implementations, the pixels visible through an individual microlens at the first viewing aperture may be determined by ray tracing from the location of the first viewing aperture through the microlens array and to the pixels 125 of the monitor 120.

For each microlens, pixels of the display that are visible at the second viewing aperture through each individual microlens of the microlens array may be determined (407). The pixels may be determined by the ray tracer 230 of the monitor processor 115 in a similar manner as described above for the first viewing aperture, for example.

For each microlens, the determined pixels that are visible at the first viewing aperture and the determined pixels that are visible at the second viewing aperture may be alternatively rendered to display a portion of a light-field at the first and second viewing apertures (409). The pixels 125 of the monitor 120 may be alternatively rendered by the pixel renderer 210 of the monitor processor 115, for example.

In some implementations, the pixel renderer 210 may render a light-field corresponding to light-field data 220 for the first viewing aperture and the second viewing aperture. The light-field data 220 may correspond to a 3-D image or 3-D video. For example, the light-field data 220 may correspond to the output of set-top box processing a 3-D movie or 3-D television program.

In some implementation, the pixel renderer 210 may determine the pixels to illuminate for the first viewing aperture based on the pixels 125 that are visible at the first viewing aperture through each individual microlens of the microlens array 130 as determined by the ray tracer 230. Similarly, the pixel renderer 210 may determine the pixels to illuminate for the second viewing aperture based on the pixels 125 that are visible at the second viewing aperture through each individual microlens of the microlens array 130 as determined by the ray tracer 230. The pixel renderer 210 may transform the light-field data 220 to account for the locations of the first and second viewing apertures and the pixels 125 that are visible through each microlens at the first and second viewing apertures, and alternatively illuminate the pixels 125 such that the viewer may perceive the light-field corresponding to the light-field data 220 through the first and second viewing apertures.

In some implementations, the pixel renderer 210 may rapidly alternate between rendering the pixels 125 for the first and second viewing apertures. A pair of glasses associated with the first and second viewing apertures may be synced with the pixel renderer 210 such that the first viewing aperture is closed when the pixel renderer 210 renders the pixels 125 for the second viewing aperture, and the second viewing aperture is closed when the pixel renderer 210 renders the pixels 125 for the first viewing aperture. In some implementations, the pixel renderer 120 may alternate between the rendering for the first and second viewing apertures at a rate of every 1/100 of a second. Other rates may also be used.

Figure 5:
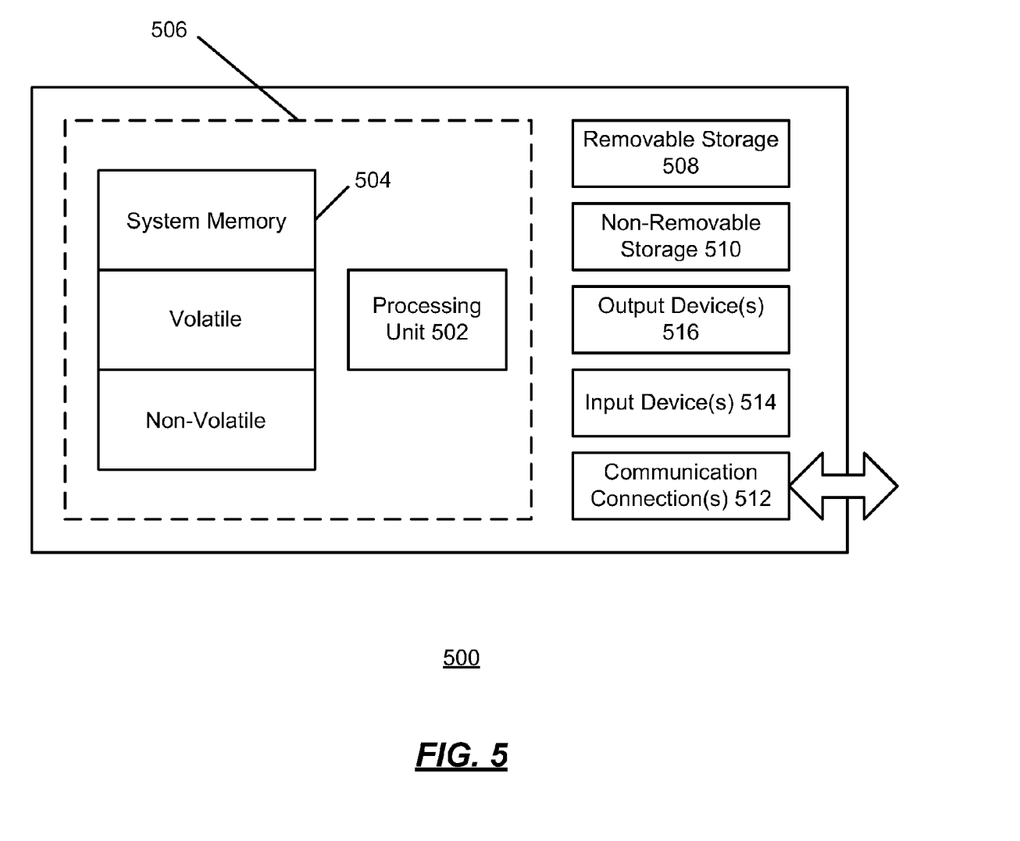
FIG. 5 is a block diagram of an example computing environment that may be used in conjunction with example embodiments and aspects.

FIG. 5 is a block diagram of an example computing environment that may be used in conjunction with example embodiments and aspects. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A light-field display comprising:
   a display device comprising a plurality of pixels;
   a microlens array placed at a separation distance from the pixels of the display device; and
   a processor communicatively coupled to the display device and adapted to:
      determine a location of a first viewing aperture that is used to view a light-field generated by the light-field display;
      determine, for each microlens of the microlens array, the pixels of the display device that are visible at the first viewing aperture through the microlens; and
      render, for each microlens of the microlens array, the determined pixels of the display device that are visible at the first viewing aperture through the microlens to display the light-field to a viewer at the first viewing aperture.

2. The light-field display of claim 1, wherein the first viewing aperture is sized to accommodate the size range of a human pupil.

3. The light-field display of claim 1, wherein the first viewing aperture is a virtual viewing aperture.

4. The light-field display of claim 1, wherein the processor is further adapted to:
   determine a location of a second viewing aperture that is used to view the light-field generated by the light-field display;
   determine, for each microlens in the microlens array, the pixels of the display device that are visible at the second viewing aperture through the microlens; and
   render, for each microlens in the microlens array, the determined pixels of the display device that are visible at the second viewing aperture through the microlens to display the light-field to the viewer at the second viewing aperture.

5. The light-field display of claim 4, wherein the processor is further adapted to alternate between the rendering for the first viewing aperture and the second viewing aperture.

6. The light-field display of claim 5, wherein the first and second viewing apertures correspond to a first aperture and a second aperture of a pair of glasses.

7. The light-field display of claim 6, wherein the pair of glasses is adapted to close the first aperture during the rendering for the second viewing aperture, and close the second aperture during the rendering for the first viewing aperture.

8. The light-field display of claim 6, wherein the processor is further adapted to receive a location signal from the pair of glasses, and determine the location of the first aperture from the location signal.

9. A method for generating a light-field display, comprising:
   positioning a microlens array at a microlens separation from a display device comprising a plurality of pixels;
   determining a location of a first viewing aperture in front of the microlens array, wherein the first viewing aperture is used to view a light-field generated by the light-field display;
   for each microlens of the microlens array, determining pixels of the display device that are visible at the first viewing aperture through the microlens of the microlens array; and
   for each microlens of the microlens array, rendering the determined pixels to display a portion of the light-field at the first viewing aperture through the microlens of the microlens array.

10. The method of claim 9, further comprising:
    determining a location of a second viewing aperture in front of the microlens array, wherein the second viewing aperture is used to view the light-field generated by the light-field display;
    for each microlens of the microlens array, determining pixels of the display device that are visible at the second viewing aperture through the microlens of the microlens array; and
    for each microlens of the microlens array, rendering the determined pixels to display a portion of the light-field at the second viewing aperture through the microlens of the microlens array.

11. The method of claim 10, further comprising alternating between the rendering for the first viewing aperture and the rendering for the second viewing aperture.

12. The method of claim 9, wherein the first and second viewing apertures correspond to a first aperture and a second aperture of a pair of glasses.

13. The method of claim 12, further comprising closing the first aperture during the rendering for the second viewing aperture, and closing the second aperture during the rendering for the first viewing aperture.

14. The method of claim 12, further comprising receiving a location signal from the pair of glasses, and determining the location of the first aperture from the location signal.

15. The method of claim 9, wherein determining pixels of the display device that are visible at the first viewing aperture through the microlens comprises ray tracing from the first viewing aperture through the microlens of the microlens array.

16. A method for generating a light-field display, comprising:
    positioning a microlens array in front of a display at a separation distance, wherein the display comprises a plurality of pixels;
    determining a location of a first viewing aperture in front of the microlens array, wherein the first viewing aperture is used to view a light-field generated by the light-field display;
    determining a location of a second viewing aperture in front of the microlens array, wherein the second viewing aperture is used to view the light-field generated by the light-field display;
    for each microlens in the microlens array, determining pixels of the display that are visible at the first viewing aperture through the microlens of the microlens array;

for each microlens in the microlens array, determining pixels of the display that are visible at the second viewing aperture through the microlens of the microlens array; and for each microlens in the microlens array, alternatively rendering the determined pixels that are visible at the first viewing aperture through the microlens of the microlens array and the determined pixels that are visible at the second viewing aperture through the microlens of the microlens array.

17. The method of claim 16, wherein the first and second viewing apertures correspond to a first aperture and a second aperture of a pair of glasses.

18. The method of claim 17, further comprising closing the first aperture during the rendering for the second viewing aperture, and closing the second aperture during the rendering for the first viewing aperture.

19. The method of claim 17, further comprising receiving a location signal from the pair of glasses, and determining the location of the first aperture from the location signal.

20. The method of claim 16, wherein determining pixels of the display that are visible at the first viewing aperture through the microlens of the microlens array comprises ray tracing from the first viewing aperture through the microlens of the microlens array.

* * * * *